Figure 1:
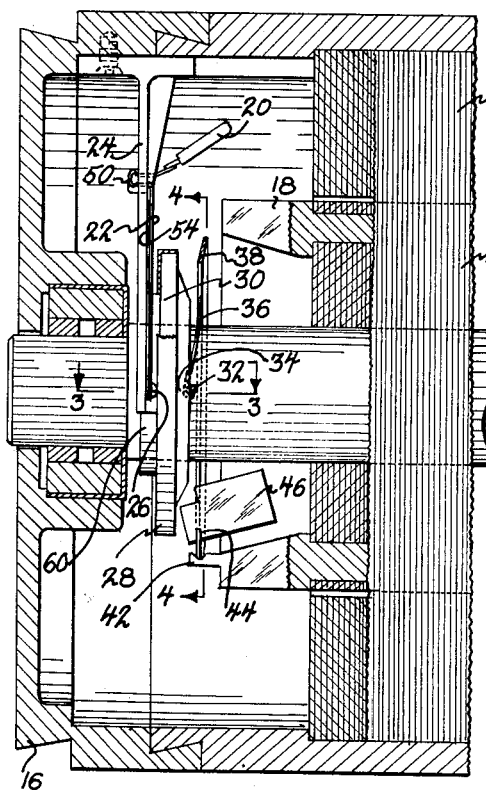

Jan. 19, 1960  E. P. LARSH  2,922,000
CENTRIFUGAL ACTUATOR AND SWITCH
Filed April 18, 1958  3 Sheets-Sheet 1

INVENTOR.
EVERETT P. LARSH
BY *Toulmin & Toulmin*

ATTOREYS

Jan. 19, 1960 E. P. LARSH 2,922,000
CENTRIFUGAL ACTUATOR AND SWITCH
Filed April 18, 1958 3 Sheets-Sheet 2
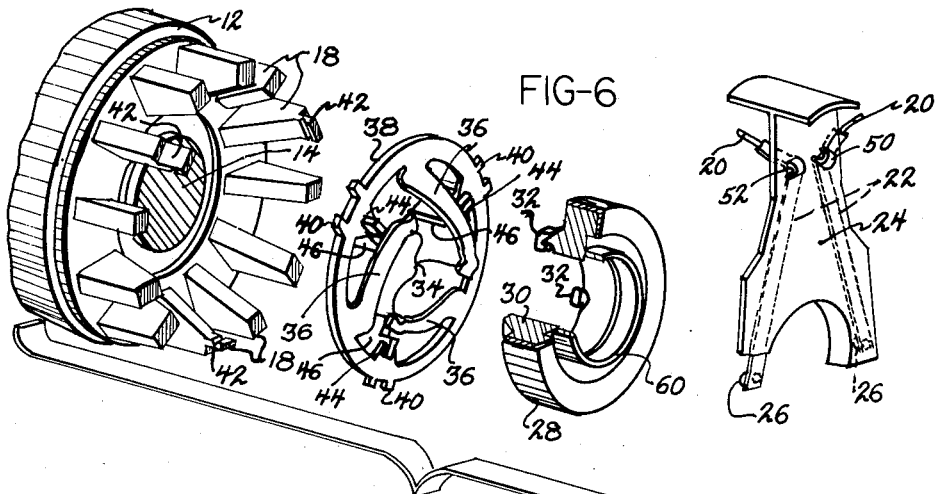
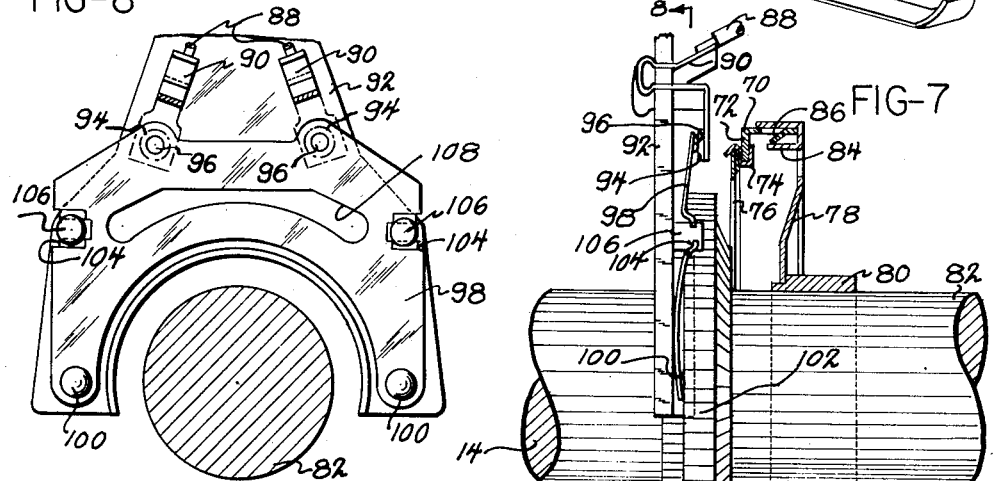
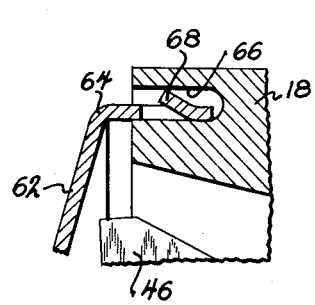
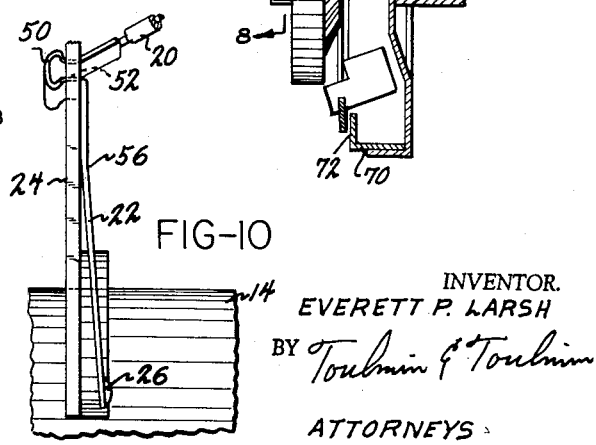
INVENTOR.
EVERETT P. LARSH
BY Toulmin & Toulmin
ATTORNEYS Jan. 19, 1960     E. P. LARSH     2,922,000
CENTRIFUGAL ACTUATOR AND SWITCH
Filed April 18, 1958     3 Sheets-Sheet 3
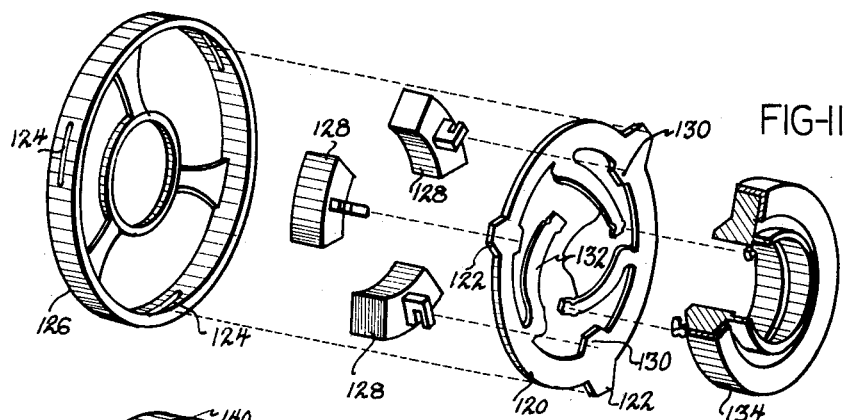
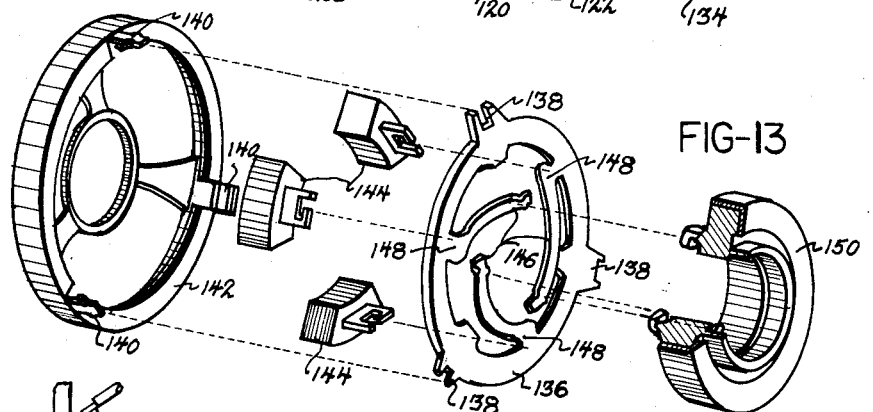
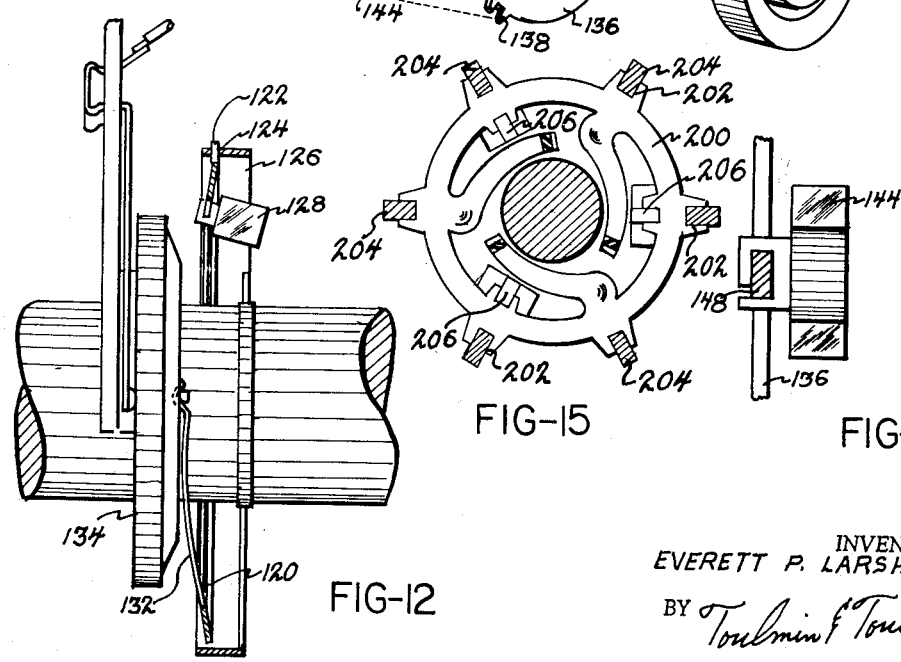
INVENTOR.
EVERETT P. LARSH
BY Toulmin & Toulmin
ATTORNEYS United States Patent Office 2,922,000
Patented Jan. 19, 1960

2,922,000

CENTRIFUGAL ACTUATOR AND SWITCH

Everett P. Larsh, Dayton, Ohio

Application April 18, 1958, Serial No. 729,388

12 Claims. (Cl. 200—80)

This invention relates to speed responsive devices, and particularly relates to a speed responsive actuating mechanism and an electric switch operated thereby.

Speed responsive devices are widely used for controlling speeds of rotating shafts and the like, and in particular in connection with electric motors for regulating the speed thereof or for controlling a portion of the windings of the electric motor during the starting period thereof and for restoring the motor to high torque starting conditions in the event the motor falls below a certain operating speed.

Speed responsive devices of this nature must be accurate, in that the centrifugal elements or weights which move in and out as the speed changes should move outwardly at a predetermined speed falling within relatively narrow limits and should again move inwardly at a predetermined lower speed also falling within relatively close limits.

Many speed responsive devices of this nature rely on resilient elements for opposing the movement of the weights, and in such devices the weights must pass an over center position to attain any sort of snap action.

In still other forms, resilient rubber-like supports are provided for the weights in the region that they pivot, and such resilient elements are usually characterized by aging or being affected by oils or other hydrocarbons often encountered about electric motors, and may change their characteristics markedly with changing temperatures. All these influences tend to alter the characteristics of the speed responsive mechanism either with temperature or age or operating conditions.

Having the foregoing in mind, it is a primary object of the present invention to provide a speed responsive actuator that avoids the difficulties above referred to and which is particularly adapted for operating an electric switch.

Another object is the provision of the combination of an improved speed responsive governor mechanism and an electric switch controlled thereby.

A still further object of this invention is the provision of an electric switch and a centrifugal actuator therefor especially adapted for being incorporated in an electric motor and having a minimum number of parts.

A still further object of this invention is the provision of an electric switch and a centrifugal actuating mechanism therefor which is substantially insensitive to ambient conditions, including temperature, oils, and the like, and the characteristics of which switch and mechanism do not tend to change with age.

It is also an object of this invention to provide an improved centrifugal switch mechanism in which pitting or burning of the contact elements of the switch mechanism is substantially eliminated.

Figure 2:
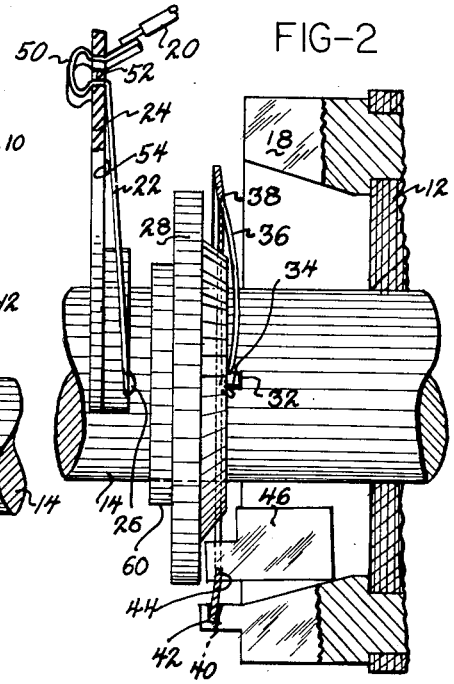
Figure 5:
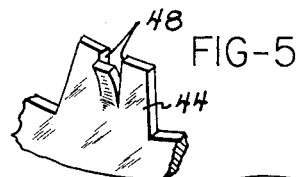
Figure 3:
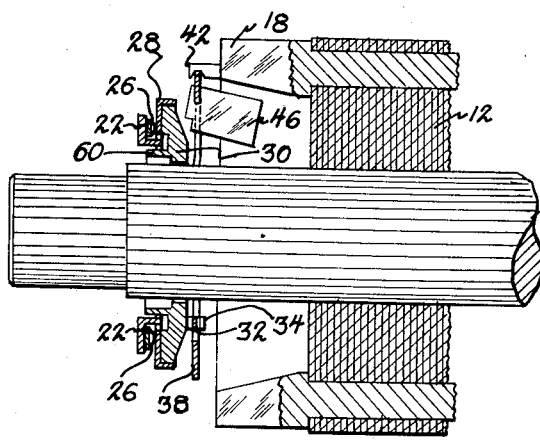
Figure 4:
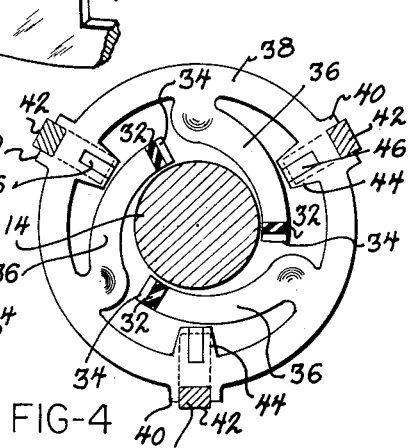

These and other objects and advantages will become more apparent upon reference to the accompanying drawings, in which:

Figure 1 is a fragmentary view showing the end of an electric motor having a switch and actuating mechanism therefor associated with the motor according to this invention, Figure 2 is an enlarged view of the switch mechanism showing the switch open, Figure 3 is a sectional view indicated by line 3—3 on Figure 1, Figure 4 is a sectional view indicated by line 4—4 on Figure 1 showing the configuration of the belville spring that forms the resilient portion of the centrifugal actuating mechanism, Figure 5 is a fragmentary view showing the manner in which the belville spring is provided with anchors for the centrifugal weights attached thereto, Figure 6 is a perspective view showing the various parts of the switch and the actuator mechanism associated therewith, Figure 7 is a sectional view showing a different supporting arrangement for the belville spring and a different switch mechanism, Figure 8 is a sectional view indicated by line 8—8 on Figure 7 showing the movable portion of the switch of Figure 7, Figure 9 is a fragmentary sectional view showing a manner in which the belville spring could be provided with an integral anchoring portion thereon, Figure 10 is a fragmentary view showing the manner in which individual resilient contact arms of the modification of Figures 1 and 2 could be formed to provide for predetermined resilience thereof when assembled with the support plate therefor, Figure 11 is an exploded perspective view of another form which the actuator of my invention can take, Figure 12 is a view like Figure 2 showing the actuator of Figure 11 but showing the switch closed, Figure 13 is a view like Figure 11 but showing another form of the invention, Figure 14 is a sectional view showing the manner of attaching the weights to the spring element of Figure 13, and Figure 15 is a view illustrating an actuator according to this invention having a greater number of pivot points about the periphery than the previous modifications.

Referring to the drawings more in detail, Figure 1 illustrates diagrammatically a motor having a stator 10 and a rotor 12, the rotor including shaft 14 journaled in end frame 16 forming a part of the casing of the motor. Rotor 12 may be of the squirrel cage type having a cast-in winding that may include fan blades 18 integral with the end ring portion of the cast winding.

The motor illustrated is of the type having main running windings and starting windings with the latter being utilized only during the starting period of the motor while the rotor is being accelerated. These starting windings are connected in circuit with the supply line by the leads 20 leading to a switching mechanism consisting of a pair of resilient conductive blades 22 carried by an insulating support plate 24 mounted in any suitable manner in the motor case.

The resilient contact arms 22 terminate in contact points 26 at their lower ends and these contact points are adapted for being bridged by a smooth metallic collector ring 28 mounted on a ring of insulating material 30 that is loosely mounted about shaft 14.

The ring 30 comprises three peripherally spaced lugs or projections 32 that are engaged by the arcuate end parts 34 of the resilient arms 36 that extend circumferentially and inwardly from the inner periphery of a belville spring washer 38. The belville spring 38 has extending from its outer periphery intermediate the points of connection thereto of the arms 36 the projections 40 which provide therebetween a notch adapted for receiving a notched projecting finger 42 on the fan means 18. As will be seen in Figure 4, three of the said notches are provided and there are accordingly three of the fingers 42 projecting from spaced ones of the blades of the fan.

Directly opposite the projections 40, the belville spring has inwardly extending weight supporting portions 44, and mounted on each of these portions is a centrifugal weight 46. The weight may be attached to the portions 44 in any desired manner but it is preferred that the projections be cut as at 48 in Figure 5 and a small tab turned out from the said portions thereby providing a means for tightly affixing the weights to the spring.

The belville spring is normally positioned as it is illustrated in Figure 1 and wherein the resilience of the spring pulls weights 46 inwardly and the spring is then convex toward the ring 30. This causes the resilient arms 36 to project outwardly from the belville spring toward ring 30 thereby to thrust the ring against the contact points 26 thereby bridging the contact points and connecting the starting winding of the motor in circuit.

When the motor has reached a predetermined speed the weights 46 throw outwardly to their Figure 2 position, thus snapping the belville spring into a position where it is at least slightly concave toward ring 30 whereby the resilient arms 36 are also snapped inwardly thus pulling ring 30 and collector ring 28 carried thereby away from contact 26 thus interrupting the circuit to the starting winding of the motor whereupon the motor continues running solely on the running winding thereof.

It will be evident that the rotation of the collector ring against contacts 26 prevents burning and pitting of the contacts and maintains a smooth, clean contact area on the contacts and on the collector ring at all times. This prevents faulty operation of the motor, as often occurs in the case of motors having switch means that include contact elements that move axially only in opening and closing movements.

A feature of the present invention is to be found in the arrangement of the resilient blades 22 so that they are provided with a protruding region 50 that can be snapped into the holes 52 provided in support plate 24. This not only provides a simple and convenient way of assembling a resilient blade with the support plate but permits ready replacement thereof should the contact elements at the tips thereof become badly worn. This enables the collector ring 28 to be formed of a relatively hard material, such as chrome bearing steel, while the resilient contact blades may be formed of Phosphor bronze or a like material, and the contact portions thereof at 26 may merely be dimples formed in the ends of the strips. This results in an inexpensive structure having long life and good operating characteristics.

The positions of the contact ends of the resilient blades 22 can be determined, as well as the resilience of the blades, by forming a projection at 54 on the back of the resilient blade or on the face of support plate 24.

The resilience and positioning of the contact ends 26 of the blades can also be determined by forming the blades with a predetermined bend therein as indicated at 56 in Figure 10. In either case, the contact ends of the blades would be sprung outwardly from the support plate 24 a predetermined distance as soon as the blades were assembled on the support plate.

The attaching of the belville spring to the rotor of the motor in the manner described eliminates all resilient support elements whereby the operating parts of the centrifugal actuator are all formed of metal and the pivot points about the spring are also metal whereby temperature within all normal operating ranges has no influence on the characteristics of the actuator and whereby oils, greases and solvents are without effect on the structure. The actuator mechanism remains in the same operating conditions throughout extremely wide ranges of temperature whereby the actuator becomes ideally adapted for use with totally enclosed motors under severe operating conditions.

Similarly, the absence of rubberlike resilient supporting elements or grommets and the wiping contact of the collector ring with the contact portions of the resilient blades makes the structure substantially insensitive to dust conditions or conditions where solvent vapors might be borne in the atmosphere or where liquids might splash to the inside of the motor or be drawn therein in the form of a fine spray.

Still another feature of the structure illustrated is to be found in the axially extending annular rib or flange 60 provided on ring 30 inside collector ring 28. This flange or ring acts as a separator thus guarding against arcing across between the contact elements as the switch opens and closes.

The belville spring may be provided with its own integral support, as illustrated in Figure 9. In Figure 9 the spring at 62 has projecting therefrom and turned back toward the rotor side the tabs 64 that extend into slot means 66 provided on fan blades of the rotor or in the end ridge of the rotor winding. These tabs are preferably provided with the struck-up portion 68 so a binding action is had in slot 66 thus fixing the spring in place.

Still other anchor means may be provided, as illustrated in the modification of Figure 7 wherein the clip or support ring 70 which has turned in edge 72 adapted for receiving the small S-shaped support clip 74 that receives the edge of the belville spring 76, and which clip or ring 70 may be received in a slot extending about the end of the rotor corresponding to slot 66 or it may, as illustrated in Figure 7, be received in a support member 78 carried by collar 80 fixed on shaft 82. Support member 78 preferably has tabs 84 turned in for engaging the struck-out parts 86 of the clip or ring 70.

In the modification of Figure 7 there is also shown a different switch arrangement wherein the wires 88 are connected with the short conductive blades 90 that are snapped into a support plate 92 similarly to the blades described in connection with the previous modification. The short blades 90 have the contact points 94 thereon adapted for being engaged by contact points 96 on a conductive member 98 which has buttons or projections 100 thereon adapted for being engaged by actuator ring 102 attached to the belville spring.

Conductive member 98 has slots 104 formed in its edge portions and these slots are adapted for engaging notches in short posts or studs 106 on support plate 92. By closely fitting the notches in the studs to the member 98 the member is normally sprung into its Figure 7 position wherein the circuit to the starting winding is open. Leftward movement of the lower end of member 98 will move the upper end thereof into bridging engagement with contact elements 94. When the switch closes, the elongated aperture 108 formed therein permits member 98 readily to conform to the contact elements 94 so that good contact pressure is had with both thereof.

The arrangement of Figure 11 is substantially identical with the modifications previously described and comprises a belville spring washer 120 having circumferentially spaced projections 122 adapted for being received in slits 124 in a support ring 126 that may be adapted for being pressed on a shaft or for being otherwise attached to a rotating object. The slits could also be provide in the rotating object, if so desired.

Weights 128 are arranged for attaching at 130 to the inner periphery of the belville spring washer so as to project from the normally concave side thereof whereby at a predetermined rotational speed the weights will move outwardly snapping the spring so that it is convex toward the weights thereby moving the fingers 132 projecting inwardly from the inner periphery of the spring backwardly toward the spring and also drawing toward the spring the ring 134 which is carried by the arcuate tips of the fingers.

The modification of Figure 13 is similar to previously described modifications and the belville spring element 136 has notched projections 138 adapted for being snapped into the grooved spring fingers 140 projecting axially from a support ring 142 adapted for being attached to a rotating object. Weights 144 in Figure 13 are adapted for being fixed to the inwardly projecting resilient fingers 146 by being attached to the fingers where they join the belville spring at 148 as indicated in Figure 14.

Similarly, as with all the previously described modifications, the belville spring is normally concave toward the weights whereby the resilient fingers 146 project outwardly on the other side of the spring washer whereas when the weights move outwardly due to centrifugal force, the belville spring snaps over so as to be convex in the weight side thereof thus moving the tips of the resilient fingers a substantial distance axially and the said fingers carry therewith the ring 150 which is attached to the inner tips of the fingers.

In all of the modifications described the feature is present of metal pivot points or fulcrum points that support the belville spring washer whereby the action of the washer as it snaps in and out is free of all influences except those of the weights attached thereto. There are no resilient supporting elements or rubber or rubber-like grommets supporting the spring or the weights or any connections between the weights and spring which might tend to vary in characteristics with temperature or be deleteriously influenced by oils or solvents. The actuator, according to the present invention, will always respond at the same speed and within extremely close limits, and thus forms a highly dependable element of the combination actuator and switch illustrated.

The preferred type switch where the collector ring is in rubbing contact therewith, stays in highly efficient operating condition because the contacts are maintained bright and clean, even in the presence of air borne fluids and particulate matter. The contacts are effectively insulated from each other due at least in part to the wide spacing therebetween, and there is little or no tendency for any substantial arcing over as the switch opens and closes due to the rapid movement of the axially movable ring carried by the actuator and to the relatively wide spacing of the actuator from the contact points after the centrifugal weights have thrown out.

In the modifications described above, the spring washer has been illustrated as having three pivot points thereabout and three weights. However, this is not to be considered as a limiting arrangement because, as illustrated in Figure 15, there may be more than the three pivot points provided.

In Figure 15 the belville spring washer 200 has a plurality of pivot points 202 thereabout engaged by rigid members 204 which support and drive the spring and which form non-yielding pivot points about which the spring snaps when the weights 206 move outwardly. There may be more than the three weights illustrated, if so desired, but in general the three weights will suffice with the arrangement of the present invention because of the more than adequate space that is available in the concave side of the spring washer for increasing the size of the weights.

A preferred arrangement is one wherein the weights are positioned intermediate the points of connection of the spring fingers with the belville spring washer and directly opposite a pivot point. This provides the best operating conditions and the spring will snap sharply with the path of movement of the weights being precisely controlled instead of following an erratic or indeterminate path as could occur where the weights were located intermediate the pivot points or where the pivot points were resilient rather than unyielding as illustrated herein.

It will be understood that this invention is susceptible to modification in order to adapt it to different usages and conditions and, accordingly, it is desired to comprehend such modifications within this invention as may fall within the scope of the appended claims.

I claim:

1. An actuator operable in response to a predetermined rotational speed comprising; an annular belville spring washer and the centrifugal weights directly attached to said washer about the inner periphery thereof and projecting toward the concave side of the washer, means engaging spaced points about the outer periphery of the washer whereby at a predetermined rotational speed the weights will move outwardly and snap the spring washer so that it is concave on the side opposite the weights, a plurality of arcuate fingers extending inwardly from the inner periphery of the washer and normally projecting outwardly therefrom on the side opposite the weights whereby the inner tips of the said fingers move axially toward the spring washer a substantial distance when the weights move outwardly, an annular member coaxial with said washer, and said member being loosely retained on the inner ends of said fingers for movement therewith as the weights move in and out.

2. An actuator operable in response to a predetermined rotational speed comprising; an annular belville spring washer, a plurality of resilient fingers integral with the washer extending arcuately from the inner periphery thereof and extending outwardly from the convex side of the washer, an annular member loosely retained on the inner tips of said fingers for movement axially of the washer therewith, a plurality of weights attached to the inner periphery of the belville spring washer at points spaced thereabout and projecting toward the concave side of the washer, and means forming non-resilient pivot points engaging said belville spring washer about the outer periphery thereof, said pivot points being located in radial alignment with said weights.

3. An actuator operable in response to a predetermined rotational speed comprising; an annular belville spring washer, a plurality of resilient fingers integral with the washer extending arcuately from the inner periphery thereof and extending outwardly from the convex side of the washer, an annular member loosely retained on the inner tips of said fingers for movement axially of the washer therewith, a plurality of weights attached to the inner periphery of the belville spring washer at points spaced thereabout and projecting toward the concave side of the washer, and means forming metallic pivot points for said belville spring washer about the outer periphery thereof, said pivot points being located about the outer periphery of the belville spring washer intermediate the points of connection to the washer of the said weights.

4. An actuator operable in response to a predetermined rotational speed comprising; an annular belville spring washer, a plurality of resilient fingers integral with the washer extending arcuately from the inner periphery thereof and extending outwardly from the convex side of the washer, an annular member loosely retained on the inner tips of said fingers for movement axially of the washer therewith, a plurality of weights attached to the inner periphery of the belville spring washer at points spaced thereabout and projecting toward the concave side of the washer, and means forming metallic pivot points for said belville spring washer about the outer periphery thereof, said pivot points being located in radial alignment with said weights, the said weights being attached to the inner periphery of the belville spring washer intermediate the said resilient fingers.

5. An actuator operable in response to a predetermined rotational speed comprising; an annular belville spring washer, a plurality of resilient fingers integral with the washer extending arcuately from the inner periphery thereof and extending outwardly from the convex side of the washer, an annular member loosely retained on the inner tips of said fingers for movement axially of the washer therewith, a plurality of weights attached to the inner periphery of the belville spring washer at points spaced thereabout and projecting toward the concave side of the washer, and means forming metallic pivot points for said belville spring washer about the outer periphery thereof, said pivot points being located about the outer periphery of the belville spring washer intermediate the points of connection to the washer of the said weights, the said weights being attached to the inner periphery of the belville spring washer intermediate the said resilient fingers.

6. An actuator operable in response to a predetermined rotational speed comprising; an annular belville spring washer, a plurality of resilient fingers integral with the washer extending arcuately from the inner periphery thereof and extending outwardly from the convex side of the washer, an annular member loosely retained on the inner tips of said fingers for movement axially of the washer therewith, a plurality of weights attached to the inner periphery of the belville spring washer at points spaced thereabout and projecting toward the concave side of the washer, and means forming metallic pivot points for said belville spring washer about the outer periphery thereof, said pivot points being located about the outer periphery of the belville spring washer intermediate the points of connection to the washer of the said weights, said weights being attached to the inner periphery of said belville spring washer at the points where the resilient fingers project from the washer.

7. An actuator operable in response to a predetermined rotational speed comprising; an annular belville spring washer, resilient fingers extending inwardly and arcuately from the inner periphery of the washer and projecting outwardly toward the convex side thereof, a plurality of weights attached directly to the inner periphery of the said washer and projecting toward the concave side thereof, an annular member loosely retained by the inner tips of said resilient fingers whereby movement inwardly and outwardly of the weights is accompanied by axial movement of the annular member, and means forming metallic pivot points spaced about the outer periphery of said belville spring washer, said means comprising a support ring having slits therein, and projections about the outer periphery of the said washer extending into the slits.

8. An actuator operable in response to a predetermined rotational speed comprising; an annular belville spring washer, resilient fingers extending inwardly and arcuately from the inner periphery of the washer and projecting outwardly toward the convex side thereof, a plurality of weights attached directly to the inner periphery of the said washer and projecting toward the concave side thereof, an annular member loosely retained by the inner tips of said resilient fingers whereby movement inwardly and outwardly of the weights is accompanied by axial movement of the annular member, and means forming metallic pivot points spaced about the outer periphery of said belville spring washer, said means comprising an annular support ring, clips extending from the support ring, and notched projections about the periphery of the washer adapted for receiving said clips.

9. An actuator operable in response to a predetermined rotational speed comprising; an annular belville spring washer, resilient fingers extending inwardly and arcuately from the inner periphery of the washer and projecting outwardly toward the convex side thereof, a plurality of weights attached directly to the inner periphery of the said washer and projecting toward the concave side thereof, an annular member loosely retained by the inner tips of said resilient fingers whereby movement inwardly and outwardly of the weights is accompanied by axial movement of the annular member, and means forming metallic pivot points spaced about the outer periphery of said belville spring washer, said means comprising a metallic projection on the end of an electric motor rotor, and the outer periphery of said washer having notch means for engaging said metallic projections.

10. An actuator operable in response to a predetermined rotational speed comprising; an annular belville spring washer, resilient fingers extending inwardly and arcuately from the inner periphery of the washer and projecting outwardly toward the convex side thereof, a plurality of weights attached directly to the inner periphery of the said washer and projecting toward the concave side thereof, an annular member loosely retained by the inner tips of said resilient fingers whereby movement inwardly and outwardly of the weights is accompanied by axial movement of the annular member, and means forming metallic pivot points spaced about the outer periphery of said belville spring washer, said means comprising tabs projecting from the outer periphery of the said washer bent backwardly toward the concave side thereof, and a support member comprising recesses adapted for receiving and supporting said tabs.

11. A centrifugal actuator comprising an annular belville spring washer, rigid means engaging spaced points about the outer periphery of said washer for supporting and rotating the washer, weights attached to spaced points about the inner periphery of the washer and extending toward the concave side thereof so as to move outwardly at a predetermined rotational speed of the washer, resilient fingers extending inwardly and circumferentially from the inner periphery of the washer and projecting toward the convex side thereof, an annular member loosely retained on the inner ends of the fingers so as to move axially of the washer as the said weights move in and out, a metallic ring mounted on said annular member, and resilient contact elements supported so as to be engaged by said ring when the weights are in and to be spaced from the ring when the weights throw out.

12. A centrifugal actuator comprising an annular belville spring washer, rigid means engaging spaced points about the outer periphery of said washer for supporting and rotating the washer, weights attached to spaced points about the inner periphery of the washer and extending toward the concave side thereof so as to move outwardly at a predetermined rotational speed of the washer, resilient fingers extending inwardly and circumferentially from the inner periphery of the washer and projecting toward the convex side thereof, an annular member loosely retained on the inner ends of the fingers so as to move axially of the washer as the said weights move in and out, a metallic ring mounted on said annular member, and resilient contact elements supported so as to be engaged by said ring when the weights are in and to be spaced from the ring when the weights throw out, each said resilient contact element comprising a straight blade having a U-shaped bend therein adjacent the end opposite the end contacted by said metal ring, and an insulating support having a pair of apertures for releasably receiving said U-shaped bends thereby to support said contact elements.

References Cited in the file of this patent

UNITED STATES PATENTS

| 2,616,682 | Greenhut | Nov. 4, 1952 |
| 2,768,260 | Greenhut | Oct. 23, 1956 |